United States Patent
Altschuler et al.

(10) Patent No.: US 9,188,252 B2
(45) Date of Patent: Nov. 17, 2015

(54) ULTRA HIGH STRENGTH STEEL HAVING GOOD TOUGHNESS

(71) Applicants: Eduardo Altschuler, Buenos Aires (AR); Teresa Perez, Buenos Aires (AR); Edgardo Lopez, Bergamo (IT); Constantino Espinosa, Buenos Aires (AR); Gonzalo Gomez, Buenos Aires (AR)

(72) Inventors: Eduardo Altschuler, Buenos Aires (AR); Teresa Perez, Buenos Aires (AR); Edgardo Lopez, Bergamo (IT); Constantino Espinosa, Buenos Aires (AR); Gonzalo Gomez, Buenos Aires (AR)

(73) Assignee: Siderca S.A.I.C., Ciudad Autónoma de Buenos Aires (AR)

( * ) Notice: Subject to any disclaimer, the term of this patent is extended or adjusted under 35 U.S.C. 154(b) by 253 days.

(21) Appl. No.: 13/787,452

(22) Filed: Mar. 6, 2013

(65) Prior Publication Data
US 2013/0199674 A1  Aug. 8, 2013

Related U.S. Application Data

(62) Division of application No. 13/031,133, filed on Feb. 18, 2011, now Pat. No. 8,414,715.

(51) Int. Cl.
*C22C 38/22* (2006.01)
*C22C 38/24* (2006.01)
(Continued)

(52) U.S. Cl.
CPC ... *F16L 9/02* (2013.01); *C21D 1/25* (2013.01); *C21D 8/10* (2013.01); *C21D 8/105* (2013.01); *C21D 9/08* (2013.01); *C21D 9/085* (2013.01); *C21D 9/14* (2013.01); *C22C 38/001* (2013.01); *C22C 38/02* (2013.01); *C22C 38/04* (2013.01);
(Continued)

(58) Field of Classification Search
None
See application file for complete search history.

(56) References Cited

U.S. PATENT DOCUMENTS 3,413,166 A  11/1968  Zackay et al.
3,655,465 A   4/1972  Snape et al.
(Continued)

FOREIGN PATENT DOCUMENTS

AR  0050159 A1  10/2006
CN  1487112     4/2004
(Continued)

OTHER PUBLICATIONS

"Seamless Steel Tubes for Pressure Purposes—Technical Delivery Conditions—Part 1: Non-alloy Steel Tubes with Specified Room Temperature Properties" British Standard BS EN 10216-1:2002 E:1-26, published May 2002.

(Continued)

*Primary Examiner* — Deborah Yee
(74) *Attorney, Agent, or Firm* — Knobbe Martens Olson & Bear LLP

(57) ABSTRACT

Embodiments of the present disclosure comprise carbon steels and methods of manufacture. In one embodiment, a double austenizing procedure is disclosed in which a selected steel composition is formed and subjected to heat treatment to refine the steel microstructure. In one embodiment, the heat treatment may comprise austenizing and quenching the formed steel composition a selected number of times (e.g., 2) prior to tempering. In another embodiment, the heat treatment may comprise subjecting the formed steel composition to austenizing, quenching, and tempering a selected number of times (e.g., 2). Steel products formed from embodiments of the steel composition in this manner (e.g., seamless tubular bars and pipes) will possess high yield strength, at least about 175 ksi (about 1200 MPa) while maintaining good toughness.

14 Claims, 3 Drawing Sheets

(51) Int. Cl.

| | | |
|---|---|---|
| *F16L 9/02* | (2006.01) | |
| *C21D 1/25* | (2006.01) | |
| *C21D 8/10* | (2006.01) | |
| *C21D 9/08* | (2006.01) | |
| *C21D 9/14* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |

(52) U.S. Cl.
CPC .................. *C22C 38/06* (2013.01); *C22C 38/22* (2013.01); *C22C 38/24* (2013.01); *C22C 38/42* (2013.01); *C22C 38/44* (2013.01); *C22C 38/46* (2013.01)

(56) References Cited

U.S. PATENT DOCUMENTS

| | | | |
|---|---|---|---|
| 3,810,793 A | | 5/1974 | Heller |
| 3,915,697 A | | 10/1975 | Giuliani et al. |
| 4,231,555 A | | 11/1980 | Saito |
| 4,336,081 A | | 6/1982 | Hijikata et al. |
| 4,354,882 A | | 10/1982 | Greer |
| 4,376,528 A | | 3/1983 | Ohshimatani et al. |
| 4,379,482 A | | 4/1983 | Suzuki et al. |
| 4,407,681 A | | 10/1983 | Ina et al. |
| 4,526,628 A | | 7/1985 | Ohno et al. |
| 4,564,392 A | | 1/1986 | Ohhashi et al. |
| 4,710,245 A | | 12/1987 | Roether |
| 4,721,536 A | | 1/1988 | Koch et al. |
| 4,812,182 A | | 3/1989 | Fang et al. |
| 4,814,141 A | | 3/1989 | Imai et al. |
| 5,352,406 A | | 10/1994 | Barteri et al. |
| 5,449,420 A * | | 9/1995 | Okada et al. ................. 148/333 |
| 5,454,883 A | | 10/1995 | Yoshie et al. |
| 5,538,566 A | | 7/1996 | Gallagher |
| 5,592,988 A | | 1/1997 | Meroni et al. |
| 5,598,735 A | | 2/1997 | Saito et al. |
| 5,879,474 A | | 3/1999 | Bhadeshia et al. |
| 5,944,921 A | | 8/1999 | Cumino et al. |
| 5,993,570 A | | 11/1999 | Gray |
| 6,030,470 A | | 2/2000 | Hensger et al. |
| 6,188,037 B1 | | 2/2001 | Hamada et al. |
| 6,196,530 B1 | | 3/2001 | Muhr et al. |
| 6,217,676 B1 | | 4/2001 | Takabe et al. |
| 6,248,187 B1 | | 6/2001 | Asahi et al. |
| 6,267,828 B1 | | 7/2001 | Kushida et al. |
| 6,311,965 B1 | | 11/2001 | Muhr et al. |
| 6,331,216 B1 | | 12/2001 | Toyooka et al. |
| 6,384,388 B1 | | 5/2002 | Anderson et al. |
| 6,514,359 B2 | | 2/2003 | Kawano |
| 6,632,296 B2 | | 10/2003 | Yoshinaga et al. |
| 6,648,991 B2 | | 11/2003 | Turconi et al. |
| 6,669,285 B1 | | 12/2003 | Park et al. |
| 6,669,789 B1 | | 12/2003 | Edelman et al. |
| 6,682,610 B1 | | 1/2004 | Inoue |
| 6,683,834 B2 | | 1/2004 | Ohara et al. |
| 6,709,534 B2 | | 3/2004 | Kusinski et al. |
| 6,767,417 B2 | | 7/2004 | Fujita et al. |
| 6,958,099 B2 | | 10/2005 | Nakamura et al. |
| 7,074,283 B2 | | 7/2006 | Omura |
| 7,083,686 B2 | | 8/2006 | Itou |
| 7,118,637 B2 | | 10/2006 | Kusinski et al. |
| 7,214,278 B2 | | 5/2007 | Kusinski et al. |
| 7,264,684 B2 | | 9/2007 | Numata et al. |
| 7,635,406 B2 | | 12/2009 | Numata et al. |
| 7,744,708 B2 | | 6/2010 | López et al. |
| 7,862,667 B2 | | 1/2011 | Turconi et al. |
| 8,002,910 B2 | | 8/2011 | Tivelli et al. |
| 8,007,601 B2 | | 8/2011 | López et al. |
| 8,007,603 B2 | | 8/2011 | Garcia et al. |
| 8,016,362 B2 | | 9/2011 | Itoga |
| 8,317,946 B2 | | 11/2012 | Arai et al. |
| 8,328,958 B2 | | 12/2012 | Turconi et al. |
| 8,414,715 B2 | | 4/2013 | Altschuler et al. |
| 8,821,653 B2 | | 9/2014 | Anelli et al. |
| 2001/0035235 A1 | | 11/2001 | Kawano |
| 2002/0011284 A1 | | 1/2002 | Von Hagen et al. |
| 2003/0019549 A1 | | 1/2003 | Turconi et al. |
| 2003/0111146 A1 | | 6/2003 | Kusinski et al. |
| 2003/0116238 A1 | | 6/2003 | Fujita |
| 2003/0155052 A1 | | 8/2003 | Kondo et al. |
| 2003/0165098 A1 | | 9/2003 | Ohara et al. |
| 2004/0118490 A1 | | 6/2004 | Klueh et al. |
| 2004/0131876 A1 | | 7/2004 | Ohgami et al. |
| 2004/0139780 A1 | | 7/2004 | Cai et al. |
| 2005/0076975 A1 | | 4/2005 | Lopez et al. |
| 2005/0087269 A1 | | 4/2005 | Merwin |
| 2006/0124211 A1 | | 6/2006 | Takano et al. |
| 2006/0137781 A1 | | 6/2006 | Kusinski et al. |
| 2006/0169368 A1 | | 8/2006 | Lopez et al. |
| 2006/0243355 A1 | | 11/2006 | Haiderer et al. |
| 2007/0089813 A1 | | 4/2007 | Tivelli |
| 2007/0137736 A1 | | 6/2007 | Omura et al. |
| 2007/0216126 A1 | | 9/2007 | Lopez et al. |
| 2008/0047635 A1 | | 2/2008 | Kondo et al. |
| 2008/0129044 A1 | | 6/2008 | Carcagno et al. |
| 2008/0219878 A1 | | 9/2008 | Kondo et al. |
| 2008/0226396 A1 | | 9/2008 | Garcia et al. |
| 2008/0314481 A1 | | 12/2008 | Garcia et al. |
| 2009/0010794 A1 | | 1/2009 | Turconi et al. |
| 2009/0047166 A1 | | 2/2009 | Tomomatsu et al. |
| 2009/0101242 A1 | | 4/2009 | Lopez et al. |
| 2010/0068549 A1 | | 3/2010 | Agazzi |
| 2010/0136363 A1 | | 6/2010 | Valdez et al. |
| 2010/0193085 A1 | | 8/2010 | Garcia |
| 2010/0294401 A1 | | 11/2010 | Gomez |
| 2010/0319814 A1 | | 12/2010 | Perez |
| 2010/0327550 A1 | | 12/2010 | Lopez |
| 2011/0097235 A1 | | 4/2011 | Turconi et al. |
| 2011/0247733 A1 | | 10/2011 | Arai et al. |
| 2012/0199255 A1 | | 8/2012 | Anelli |
| 2013/0264123 A1 | | 10/2013 | Altschuler |
| 2014/0057121 A1 | | 2/2014 | Altschuler |
| 2014/0251512 A1 | | 9/2014 | Gomez |
| 2014/0299235 A1 | | 10/2014 | Anelli |
| 2014/0299236 A1 | | 10/2014 | Anelli |

FOREIGN PATENT DOCUMENTS

| | | | |
|---|---|---|---|
| CN | 101613829 A | 12/2009 | |
| CN | 101413089 | 11/2010 | |
| EP | 0 092 815 | 11/1983 | |
| EP | 0 658 632 | 6/1995 | |
| EP | 0 753 595 | 1/1997 | |
| EP | 0 828 007 | 3/1998 | |
| EP | 0 989 196 | 3/2000 | |
| EP | 01027944 | 8/2000 | |
| EP | 1 277 848 | 1/2003 | |
| EP | 1 288 316 | 3/2003 | |
| EP | 1 413 639 | 4/2004 | |
| EP | 1 717 324 | 11/2006 | |
| EP | 1 914 324 | 4/2008 | |
| EP | 2 028 284 | 2/2009 | |
| EP | 2 133 442 | 12/2009 | |
| JP | 60-086209 | 5/1985 | |
| JP | 60-215719 | 10/1985 | |
| JP | 36025719 | 10/1985 | |
| JP | 61270355 | 11/1986 | |
| JP | 63004046 A2 | 1/1988 | |
| JP | 63004047 A2 | 1/1988 | |
| JP | 63230847 A2 | 9/1988 | |
| JP | 63230851 A2 | 9/1988 | |
| JP | 01-242761 A * | 9/1989 | .............. C22C 38/46 |
| JP | 01 259124 A2 | 10/1989 | |
| JP | 01 259125 A2 | 10/1989 | |
| JP | 01 283322 A2 | 11/1989 | |
| JP | 05-098350 | 12/1990 | |
| JP | 403006329 A | 1/1991 | |

(56) References Cited

FOREIGN PATENT DOCUMENTS

| | | |
|---|---|---|
| JP | 04 021718 A2 | 1/1992 |
| JP | 04 107214 | 4/1992 |
| JP | 04 231414 A2 | 8/1992 |
| JP | 05 287381 A2 | 11/1993 |
| JP | 06-093339 | 4/1994 |
| JP | 06 172859 A2 | 6/1994 |
| JP | 06-220536 | 8/1994 |
| JP | 07 041856 A2 | 2/1995 |
| JP | 07 197125 A2 | 8/1995 |
| JP | 08 311551 | 11/1996 |
| JP | 09 067624 A2 | 3/1997 |
| JP | 09-235617 | 9/1997 |
| JP | 10 140250 | 5/1998 |
| JP | 10176239 | 6/1998 |
| JP | 10 280037 A | 10/1998 |
| JP | 11 050148 A | 2/1999 |
| JP | 11140580 | 5/1999 |
| JP | 11229079 | 8/1999 |
| JP | 2000-063940 | 2/2000 |
| JP | 2000-178645 | 6/2000 |
| JP | 2000-248337 A | 9/2000 |
| JP | 2000-313919 A2 | 11/2000 |
| JP | 2001-131698 | 5/2001 |
| JP | 2001-164338 | 6/2001 |
| JP | 2001-172739 A2 | 6/2001 |
| JP | 2001-271134 | 10/2001 |
| JP | 2002-096105 A2 | 4/2002 |
| JP | 2004-011009 | 1/2004 |
| JP | 60 174822 | 9/2005 |
| KR | 0245031 | 3/2000 |
| WO | WO 96/22396 | 7/1996 |
| WO | WO 00/70107 | 11/2000 |
| WO | WO 01/88210 | 11/2001 |
| WO | WO 03/033856 | 4/2003 |
| WO | WO 2004/031420 | 4/2004 |
| WO | WO 2004/097059 | 11/2004 |
| WO | WO 2007/017161 | 2/2007 |
| WO | WO 2008/003000 | 1/2008 |
| WO | WO 2008/127084 | 10/2008 |
| WO | WO 2009/044297 | 4/2009 |
| WO | WO 2010/061882 | 6/2010 |

OTHER PUBLICATIONS

"Seamless Steel Tubes for Pressure Purposes—Technical Delivery Conditions—Part 2: Non-alloy and Alloy Steel Tubes with Specified Elevated Temperature Properties" British Standard BS EN 10216-2:2002+A2:2007:E:1-45, published Aug. 2007.

"Seamless Steel Tubes for Pressure Purposes—Technical Delivery Conditions—Part 3: Alloy Fine Grain Steel Tubes" British Standard BS EN 10216-3:2002 +A1:2004 E:1-34, published Mar. 2004.

"Seamless Steel Tubes for Pressure Purposes—Technical Delivery Conditions—Part 4: Non-alloy and Alloy Steel Tubes with Specified Low Temperature Properties" British Standard BS EN 10216-4:2002 + A1:2004 E:1-30, published Mar. 2004.

Aggarwal, R. K., et al.: "Qualification of Solutions for Improving Fatigue Life at SCR Touch Down Zone", Deep Offshore Technology Conference, Nov. 8-10, 2005, Vitoria, Espirito Santo, Brazil, in 12 pages.

Anelli, E., D. Colleluori, M. Pontremoli, G. Cumino, A. Izquierdo, H. Quintanilla, "Metallurgical design of advanced heavy wall seamless pipes for deep-water applications", 4th International Conference on Pipeline Technology, May 9 to 13, 2004, Ostend, Belgium.

Asahi, et al., Development of Ultra-high-strength Linepipe, X120, Nippon Steel Technical Report, Jul. 2004, Issue 90, pp. 82-87.

ASM Handbook, Mechanical Tubing and Cold Finishing, Metals Handbook Desk Edition, (2000), 5 pages.

Bai, M., D. Liu, Y. Lou, X. Mao, L. Li, X. Huo, "Effects of Ti addition on low carbon hot strips produced by CSP process", Journal of University of Science and Technology Beijing, 2006, vol. 13, N° 3, p. 230.

Beretta, Stefano et al., "Fatigue Assessment of Tubular Automotive Components in Presence of Inhomogeneities", Proceedings of IMECE2004, ASME International Mechanical Engineering Congress, Nov. 13-19, 2004, pp. 1-8.

Berner, Robert A., "Tetragonal Iron Sulfide", Science, Aug. 31, 1962, vol. 137, Issue 3531, pp. 669.

Berstein et al.,"The Role of Traps in the Microstructural Control of Hydrogen Embrittlement of Steels" Hydrogen Degradation of Ferrous Alloys, Ed. T. Oriani, J. Hirth, and M. Smialowski, Noyes Publications, 1988, pp. 641-685.

Boulegue, Jacques, "Equilibria in a sulfide rich water from Enghien-les-Bains, France", Geochimica et Cosmochimica Acta, Pergamom Press, 1977, vol. 41, pp. 1751-1758, Great Britain.

Bruzzoni et al., "Study of Hydrogen Permeation Through Passive Films on Iron Using Electrochemical Impedance Spectroscopy", PhD Thesis, 2003, Universidad Nacional del Comahue de Buenos Aires, Argentina.

Cancio et al., "Characterization of microalloy precipitates in the austenitic range of high strength low alloy steels", Steel Research, 2002, vol. 73, pp. 340-346.

Carboni, A., A. Pigani, G. Megahed, S. Paul, "Casting and rolling of API X 70 grades for artic application in a thin slab rolling plant", Stahl u Eisen, 2008, N° 1, p. 131-134.

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

Clark, A. Horrell, "Some Comments on the Composition and Stability Relations of Mackinawite", Neues Jahrbuch fur Mineralogie, 1966, vol. 5, pp. 300-304, London, England.

Craig, Bruce D., "Effect of Copper on the Protectiveness of Iron Sulfide Films", Corrosion, National Association of Corrosion Engineers, 1984, vol. 40, Issue 9, pp. 471-474.

D.O.T. 178.68 Spec. 39, pp. 831-840, Non reusable (non refillable) cylinders, Oct. 1, 2002.

De Medicis, Rinaldo, "Cubic FeS, A Metastable Iron Sulfide", Science, American Association for the Advancement of Science, Steenbock Memorial Library, Dec. 11, 1970, vol. 170, Issue 3963, pp. 723-728.

Echaniz, G., Morales, C., Perez, T., "Advances in Corrosion Control and Materials in Oil and Gas Production" Papers from Eurocorr 97 and Eurocorr 98, 13, P. S. Jackman and L.M. Smith, Published for the European Federation of Corrosion, No. 26, European Federation of Corrosion Publications, 1999.

Fang, Hong-Sheng, et al.: "The Developing Prospect of Air-cooled Baintitic Steels", International Journal of Issi, vol. 2, No. 2, Feb. 1, 2005, pp. 9-18.

Gojic, Mirko and Kosec, Ladislav, , "The Susceptibility to the Hydrogen Embrittlement of Low Alloy Cr and CrMo Steels", ISIJ International, 1997, vol. 37, Issue 4, pp. 412-418.

Heckmann, et al., Development of low carbon Nb—Ti—B microalloyed steels for high strength large diameter linepipe, Ironmaking and Steelmaking, 2005, vol. 32, Issue 4, pp. 337-341.

Howells, et al.: "Challenges for Ultra-Deep Water Riser Systems", IIR, London, Apr. 1997, 11 pages.

Hutchings et al., "Ratio of Specimen thickness to charging area for reliable hydrogen permeation measurement", British Corrosion. Journal, 1993, vol. 28, Issue 4, pp. 309-312.

Iino et al., "Aciers pour pipe-lines resistant au cloquage et au criquage dus a l'hydrogene", Revue de Metallurgie, 1979, vol. 76, Issue 8-9, pp. 591-609.

Ikeda et al., "Influence of Environmental Conditions and Metallurgical Factors on Hydrogen Induced Cracking of Line Pipe Steel", Corrosion/80, National Association of Corrosion Engineers, 1980, vol. 8, pp. 8/1-8/18, Houston, Texas.

Izquierdo, et al.: "Qualification of Weldable X65 Grade Riser Sections with Upset Ends to Improve Fatigue Performance of Deepwater Steel Catenary Risers", Proceedings of the Eighteenth International Offshore and Polar Engineering Conference, Vancouver, BC, Canada, Jul. 6-11, 2008, p. 71.

Johnston, P. W., G.Brooks, "Effect of Al2O3 and TiO2 Additions on the Lubrication Characteristics of Mould Fluxes", Molten Slags, Fluxes and Salts '97 Conference, 1997 pp. 845-850.

(56) References Cited

OTHER PUBLICATIONS

Keizer, Joel, "Statistical Thermodynamics of Nonequilibrium Processes", Spinger-Verlag, 1987.

Kishi, T., H.Takeucgi, M.Yamamiya, H.Tsuboi, T.Nakano, T.Ando, "Mold Powder Technology for Continuous Casting of Ti-Stabilized Stainless Steels", Nippon Steel Technical Report, No. 34, Jul. 1987, pp. 11-19.

Korolev, D. F., "The Role of Iron Sulfides in the Accumulation of Molybdenum in Sedimentary Rocks of the Reduced Zone", Geochemistry, 1958, vol. 4, pp. 452-463.

Lee, Sung Man and Lee, Jai Young, "The Effect of the Interface Character of TiC Particles on Hydrogen Trapping in Steel", Acta Metall., 1987, vol. 35, Issue 11, pp. 2695-2700.

Mishael, et al., "Practical Applications of Hydrogen Permeation Monitoring," Corrosion, Mar. 28-Apr. 1, 2004, Corrosion 2004, Nacional Association of Corrosion Engineers, vol. Reprint No. 04476.

Morice et al., "Moessbauer Studies of Iron Sulphides", J. Inorg. Nucl. Chem., 1969, vol. 31, pp. 3797-3802.

Mukongo, T., P.C.Pistorius, and A.M.Garbers-Craig, "Viscosity Effect of Titanium Pickup by Mould Fluxes for Stainless Steel", Ironmaking and Steelmaking, 2004, vol. 31, No. 2, pp. 135-143.

Mullet et al., "Surface Chemistry and Structural Properties of Mackinawite Prepared by Reaction of Sulfide Ions with Metallic Iron", Geochemica et Cosmochemica Acta, 2002, vol. 66, Issue 5, pp. 829-836.

Murcowchick, James B. and Barnes, H.L., "Formation of a cubic FeS", American Mineralogist, 1986, vol. 71, pp. 1243-1246.

Nagata, M., J. Speer, D. Matlock, "Titanium nitride precipitation behavior in thin slab cast high strength low alloyed steels", Metallurgical and Materials Transactions A, 2002, vol. 33A, p. 3099-3110.

Nakai et al., "Development of Steels Resistant to Hydrogen Induced Cracking in Wet Hydrogen Sulfide Environment", Transactions of the ISIJ, 1979, vol. 19, pp. 401-410.

Pressure Equipment Directive 97/23/EC, May 29, 1997, downloaded from website:http://ec.europa.eu/enterprise/pressure_equipment/ped/index_en.html on Aug. 4, 2010.

Prevéy, Paul, et al., "Introduction of Residual Stresses to Enhance Fatigue Performance in the Initial Design", Proceedings of Turbo Expo 2004, Jun. 14-17, 2004, pp. 1-9.

Rickard, D.T., "The Chemistry of Iron Sulfide Formation at Low Tempuratures", Stockholm Contrib. Geol., 1969, vol. 26, pp. 67-95.

Riecke, Ernst and Bohnenkamp, Konrad, "Uber den Einfluss von Gittersoerstellen in Eisen auf die Wassersroffdiffusion", Z. Metallkde . . . , 1984, vol. 75, pp. 76-81.

Shanabarger, M.R. and Moorhead, R. Dale, "H2O Adsorption onto clean oxygen covered iron films", Surface Science, 1996, vol. 365, pp. 614-624.

Shoesmith, et al., "Formation of Ferrous Monosulfide Polymorphs During Corrosion of Iron by Aqueous Hydrogen Sulfide at 21 degrees C", Journal of the Electrochemical Society, 1980, vol. 127, Issue 5, pp. 1007-1015.

Skoczylas, G., A.Dasgupta, R.Bommaraju, "Characterization of the chemical interactions during casting of High-titanium low carbon enameling steels", 1991 Steelmaking Conference Proceeding, pp. 707-717.

Smyth, D., et al.: Steel Tublar Products, Properties and Selection: Irons, Steels, and High-Performance Alloys, vol. 1, ASM Handbook, ASM International, 1990, p. 327-336.

Spry, Alan, "Metamorphic Textures", Perganom Press, 1969, New York.

Taira et al., "HIC and SSC Resistance of Line Pipes for Sour Gas Service, Nippon Kokan Technical Report", 1981, vol. 31, Issue 1-13.

Taira et al., "Study on the Evaluation of Environmental Condition of Wet Sour Gas", Corrosion 83 (Reprint. No. 156, National Association of Corrosion Engineers), 1983, pp. 156/2-156/13, Houston, Texas.

Takeno et al., "Metastable Cubic Iron Sulfide—With Special Reference to Mackinawite", American Mineralogist, 1970, vol. 55, pp. 1639-1649.

Tenaris Newsletter for Pipeline Services, Apr. 2005, p. 1-8.

Tenaris Newsletter for Pipeline Services, May 2003, p. 1-8.

Thethi, et al.: "Alternative Construction for High Pressure High Temperature Steel Catenary Risers", OPT USA, Sep. 2003, p. 1-13.

Thewlis, G., Weldability of X100 linepipe, Science and Technology of Welding and Joining, 2000, vol. 5, Issue 6, pp. 365-377.

Tivelli, M., G. Cumino, A. Izquierdo, E. Anelli, A. Di Schino, "Metallurgical Aspects of Heavy Wall-High Strength Seamless Pipes for Deep Water Applications", RioPipeline 2005, Oct. 17 to 19, 2005, Rio (Brasil), Paper n° IBP 1008_05.

Todoroki, T. Ishii, K. Mizuno, A. Hongo, "Effect of crystallization behavior of mold flux on slab surface quality of a Ti-bearing Fe—Cr—Ni super alloy cast by means of continuous casting process", Materials Science and Engineering A, 2005, vol. 413-414, p. 121-128.

Turconi, G. L.: "Improvement of resistance to SSC initiation and propagation of high strength OCTG through microstruture and precipitation control"; "Paper 01077", NACE International, Houston, TX, Mar. 16, 2001. (XP009141583).

Vaughan, D. J. and Ridout, M.S., "Moessbauer Studies of Some Sulphide Minerals", J. Inorg Nucl. Chem., 1971, vol. 33, pp. 741-746.

Wegst, C.W., "Stahlüssel", Auflage 1989, Seite 119, 2 pages.

Mehling, Wilfred L.: "Hot Upset Forging," ASM Handbook vol. 14, 1998, pp. 84-95.

* cited by examiner

ULTRA HIGH STRENGTH STEEL HAVING GOOD TOUGHNESS

RELATED APPLICATION

This application is related to Applicant's application entitled HIGH STRENGTH STEEL HAVING GOOD TOUGHNESS, Ser. No. 13/031,131, filed Feb. 18, 2011 now U.S. Pat. No. 8,414,715, the entirety of which is hereby incorporated by reference.

INCORPORATION BY REFERENCE TO ANY PRIORITY APPLICATIONS

Any and all applications for which a foreign or domestic priority claim is identified in the Application Data Sheet as filed with the present application, are hereby incorporated by reference under 37 CFR 1.57.

BACKGROUND OF THE INVENTION

1. Field of the Invention

The present invention relates generally to metal production and, in certain embodiments, relates to methods of producing metallic tubular bars having high strength while concurrently possessing good toughness.

2. Description of the Related Art

Seamless steel tubes are widely used in a variety of industrial applications. Due to requirements for higher load bearing capacity, situations of dynamic stresses and the need for lighter components, there is an increasing demand for the development of steel tubes possessing increased strength and toughness.

In the oil industry, perforating guns comprising steel tubes containing explosive charges are used to deliver explosive charges to selected locations of wells. The steel tubes used as perforating gun carriers are subjected to very high external collapse loads that are exerted by the hydrostatic well pressure. On the other hand, during detonation, the steel tubes are also subjected to very high dynamic loads. To address this issue, efforts have been directed to the development of steel tubes with high strength, while at the same time maintaining very good impact toughness.

At present, the highest available grade in the market has a minimum yield strength of about 155 ksi. As a result, thick walled tubes are often employed in certain formations in order to withstand the high collapse pressures present. However, the use of thick walled tubes significantly reduces the working space available for the explosive charges, which may limit the range of applications in which the tubes may be employed.

From the foregoing, then, there is a need for improved compositions for metallic tubular bars, and, in particular, systems and methods for producing metallic tubular bars with a combination of high tensile properties and toughness.

SUMMARY OF THE INVENTION

Embodiments of the invention are directed to steel tubes and methods of manufacturing the same. In one embodiment, a double austenizing procedure is disclosed in which a selected steel composition is formed and subjected to heat treatment to refine the steel microstructure. In one embodiment, the heat treatment may comprise austenizing and quenching the formed steel composition a selected number of times (e.g., 2 or no more than 2) prior to tempering. In another embodiment, the heat treatment may comprise subjecting the formed steel composition to austenizing, quenching, and tempering a selected number of times (e.g., 2 or no more than 2). Steel products formed from embodiments of the steel composition in this manner (e.g., seamless tubular bars and pipes) will possess high yield strength, e.g., at least about 175 ksi (about 1200 MPa) while maintaining good toughness.

In an embodiment, a steel tube is provided, the steel tube comprising:
about 0.25 wt. % to about 0.35 wt. % carbon;
about 0.30 wt. % to about 0.70 wt. % manganese;
about 0.10 wt. % to about 0.30 wt. % silicon;
about 0.90 wt. % to about 1.70 wt. % chromium;
about 0.60 wt. % to about 1.00 wt. % molybdenum;
about 0.050 wt. % to about 0.150 wt. % vanadium and
about 0.01 wt. % to about 0.04 wt. % aluminum;
the remainder of the composition comprising iron and impurities;
wherein the steel tube is processed to have a yield strength greater than about 175 ksi and wherein the Charpy V-notch energy is greater or equal to about 50 J/cm$^2$ in the transverse direction and 65 J/cm$^2$ in the longitudinal direction at about room temperature.

In another embodiment, a method of making a steel tube is provided, the method, comprising:
providing a carbon steel composition;
forming the steel composition into a tube;
heating the formed steel tube in a first heating operation to a first temperature;
quenching the formed steel tube in a first quenching operation from the first temperature at a first rate such that the microstructure of the quenched steel is greater than or equal to about 95% martensite by volume;
heating the formed steel tube after the first quenching operation in a second heating operation to a second temperature less than the first temperature;
quenching the formed steel tube in a second quenching operation from the second temperature at a second rate such that the microstructure of the quenched steel is greater than or equal to about 95% martensite by volume, wherein the formed steel tube has a smaller grain size as compared to the grain size after the first quenching operation; and
tempering the formed steel tube after the second quenching operation by heating the formed steel tube to a third temperature less than about 550° C.;
where the steel tube after tempering has a yield strength greater than about 175 ksi and wherein the Charpy V-notch energy is greater or equal to about 50 J/cm$^2$ in the traverse direction and 65 J/cm$^2$ in the longitudinal direction at about room temperature.

In a further embodiment, a method of forming a steel tube is provided, the method comprising:
providing a steel rod comprising:
about 0.25 wt. % to about 0.35 wt. % carbon;
about 0.30 wt. % to about 0.70 wt. % manganese;
about 0.10 wt. % to about 0.30 wt. % silicon;
about 0.90 wt. % to about 1.70 wt. % chromium;
about 0.60 wt. % to about 1.00 wt. % molybdenum;
about 0.050 wt. % to about 0.150 wt. % vanadium;
about 0.01 wt. % to about 0.04 wt. % aluminum;
less than or equal to about 0.50% nickel;
less than or equal to about 0.040 wt. % niobium
less than or equal to about 0.015 wt. % titanium; and
less than or equal to about 0.05 wt. % calcium;
forming the steel rod into a tube in a hot forming operation at a temperature of about 1200° C. to 1300° C.;

heating the formed steel tube in a first heating operation to a first temperature of about 900° C. to 950° C. for about 10 to 30 minutes;

quenching the formed steel tube in a first quenching operation from the first temperature at a first rate such that the microstructure of the quenched steel is greater than or equal to about 95% martensite by volume and is substantially free of carbides;

heating the formed steel tube after the first quenching operation in a second heating operation to a second temperature, lower than the first temperature, of about 880° C. to 930° C. for about 10 to 30 minutes;

quenching the formed steel composition in a second quenching operation from the second temperature at a second rate such that the microstructure of the quenched steel is greater than or equal to about 95% martensite by volume and is substantially free of carbides and having a smaller grain size as compared to the grain size after the first quenching operation; and tempering the formed steel tube after the second quenching operation by heating the formed steel tube to a third temperature between about 450° C. to about 550° C. for between about 5 minutes to about 30 minutes;

where the steel tube after tempering has a yield strength greater than about 175 ksi and wherein the Charpy V-notch energy is greater or equal to about 50 J/cm$^2$ in the traverse direction and 65 J/cm$^2$ in the longitudinal direction at about room temperature.

DETAILED DESCRIPTION

Figure 1:
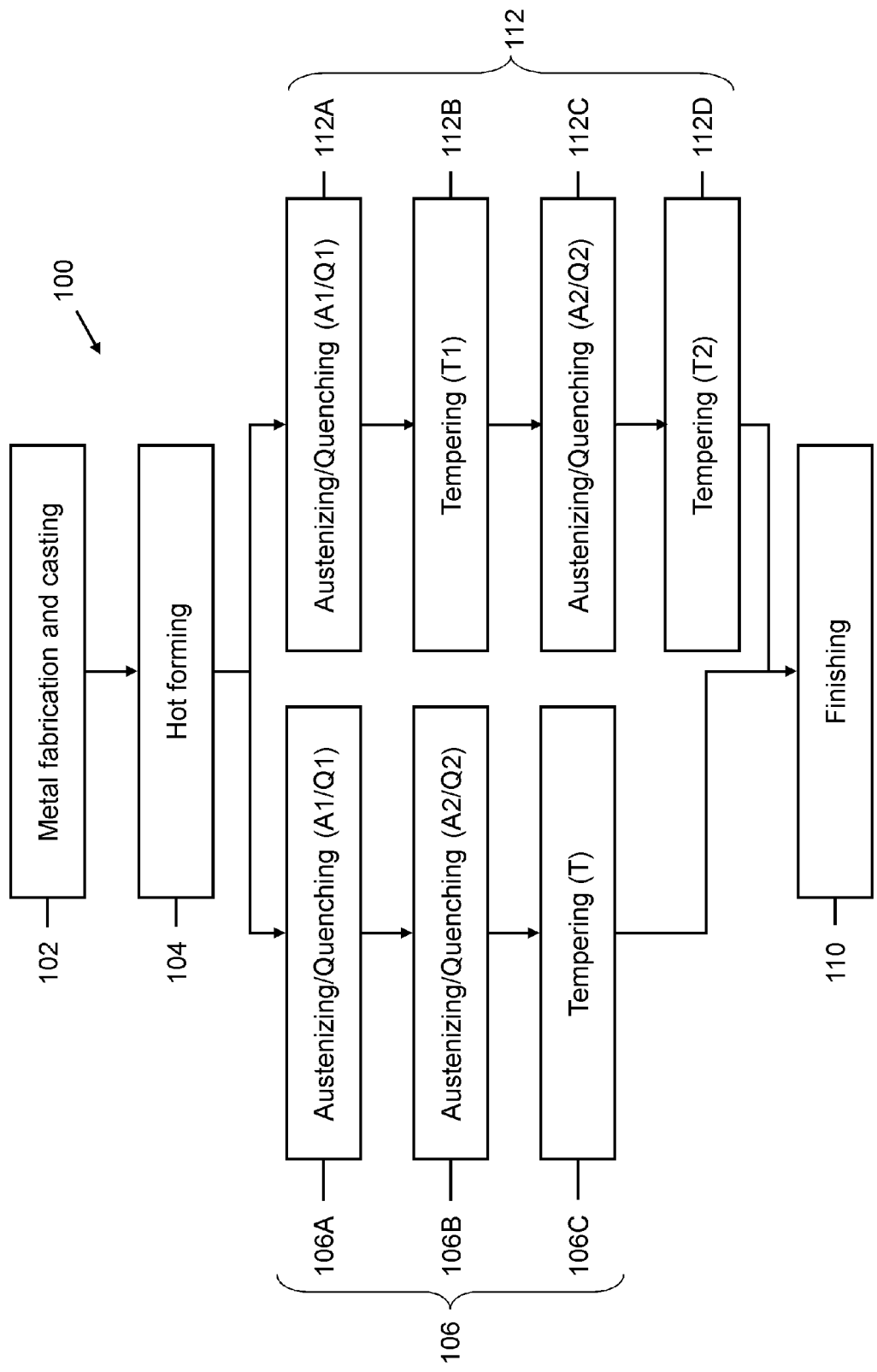
FIG. 1 is one embodiment of a method of forming a high strength steel.

Embodiments of the present disclosure provide steel compositions, tubular bars (e.g., pipes) formed using the steel compositions, and respective methods of manufacture. The tubular bars may be employed, for example, as perforating gun carriers for in the oil and gas industry. It may be understood, however, that tubular bars comprise one example of articles of manufacture which may be formed from embodiments of the steels of the present disclosure and should in no way be construed to limit the applicability of the disclosed embodiments.

The term "bar" as used herein is a broad term and includes its ordinary dictionary meaning and also refers to a generally hollow, elongate member which may be straight or have bends or curves and be formed to a predetermined shape, and any additional forming required to secure the formed tubular bar in its intended location. The bar may be tubular, having a substantially circular outer surface and inner surface, although other shapes and cross-sections are contemplated as well. As used herein, the term "tubular" refers to any elongate, hollow shape, which need not be circular or cylindrical.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount.

The term "room temperature" as used herein has its ordinary meaning as known to those skilled in the art and may include temperatures within the range of about 16° C. (60° F.) to about 32° C. (90° F.).

In general, embodiments of the present disclosure comprise carbon steels and methods of manufacture. In one embodiment, a selected steel composition is formed and subjected to heat treatment to refine the steel microstructure. In one embodiment, the heat treatment may comprise austenizing and quenching the formed steel composition a selected number of times (e.g., 2 or no more than 2) prior to tempering to refine the grain size of the final microstructure. This refinement may improve the strength and toughness of the formed steel composition. Repeating the austenizing and quenching operations twice may be referred to herein as double austenizing. It may be understood, however, that the austenizing and quenching operations may be performed any number of times, without limit, to achieve the desired microstructure and mechanical properties. In another embodiment, the heat treatment may comprise subjecting the formed steel composition to austenizing, quenching, and tempering a selected number of times (e.g., 2 or no more than 2).

It is anticipated that embodiments of articles formed from the disclosed steel compositions (e.g., tubular bars and pipes) may possess high yield strength, at least about 175 ksi (about 1200 MPa) while maintaining good toughness. For example, experiments discussed herein illustrate that steels formed from embodiments of the disclosed composition may further exhibit Charpy V-notch impact energies at room temperature greater than about 65 J/cm$^2$ in the LC direction and about 50 J/cm$^2$ in the CL direction, in accordance with ASTM Standard E23. As discussed in greater detail below, these improvements in properties are achieved, at least in part, due to refinement of the microstructure of the formed steel compositions (e.g., grain size, packet size and average carbide size) as a result of varying the temperatures of respective austenizing operations.

For example, in one embodiment, repeated austenizing and quenching operations at different temperatures may be employed to refine the grain size and packet size of the formed steel tube with the objective of improving the toughness of the steel tube. For example, the grain size of the tube can be reduced by decreasing the austenizing temperature, as grain growth is a diffusion controlled process that may be delayed by reducing the austenizing temperature. However the austenizing temperature should be high enough to decompose substantially all of the iron carbides (cementite) in the steel composition. If the austenizing temperature is not high enough, large cementite particles may remain in the final microstructure of the steel that impair the toughness of the steel. Thus, in order to improve the toughness of the steel, the austenizing temperature is preferably selected to be slightly above the minimum value to that is needed to dissolve the cementite. While temperatures higher than this minimum may guarantee the decomposition of cementite, they may produce excessive grain growth.

For this reason, a preferred temperature range for austenizing is provided in each condition. The preferred range depends on the iron carbide size of the initial microstructure. In an embodiment, if the steel is in the as hot-rolled condition (e.g., the case of the first austenizing treatment), the minimum temperature is preferably high enough to dissolve the large carbides appearing in the starting microstructure (e.g., about 900° C. to about 950° C.). If the material is in the as-quenched condition (e.g., the case of a second austenizing performed without intermediate tempering) there are substantially no cementite carbides present in the initial microstructure, so the minimum austenizing temperature is preferably lower (e.g., about 880° C. to about 930° C.).

These observations may be employed to reduce the austenizing temperature for refining the steel microstructure. If an intermediate tempering is performed, cementite carbides may be precipitated during tempering resulting in an increase in the minimum austenizing temperature as compared to the ideal case of the as quenched condition with substantially no cementite carbides.

However during industrial processing it may be not possible or feasible to perform a double austenizing and quenching procedure without intermediate tempering. Therefore, the double austenizing, quenching, and tempering treatment may be performed instead. When performing an intermediate tempering, reducing the tempering temperature is desirable in order to avoid the precipitation of large carbides, which need a higher austenizing temperature to be dissolved. For this reason, the intermediate tempering temperature is limited to about 550° C. or less.

In further embodiments, the presence of a relatively large amount of vanadium (V) within the composition (e.g., within the range between about 0.050 wt. % to about 0.150 wt. %) promotes the formation of a larger density of vanadium carbides, in addition to iron carbides, during tempering than would otherwise be achieved. The use of relatively low tempering temperatures, within the range between about 450° C. to about 550° C., may result in the precipitation of fine vanadium carbides. These fine vanadium carbides may have a size (e.g., largest dimension such as diameter) less than or equal to about 30 nm. The increase in density of fine vanadium carbide precipitates within the microstructure, owing the processing route discussed above, may also contribute to observed increases in strength and toughness by particle dispersion hardening.

In certain embodiments, the metal composition of the present disclosure preferably comprises a steel alloy comprising not only carbon (C) but also manganese (Mn), silicon (Si), chromium (Cr), molybdenum (Mo), vanadium (V), and aluminum (Al). Additionally, one or more of the following elements may be optionally present and/or added as well: nickel (Ni), niobium (Nb), titanium (Ti), and calcium (Ca). The remainder of the composition may comprise iron (Fe) and impurities. In certain embodiments, the concentration of impurities may be reduced to as low an amount as possible. Embodiments of impurities may include, but are not limited to, sulfur (S), phosphorous (P), copper (Cu), nitrogen (N), lead (Pb), tin (Sn), arsenic (As), antimony (Sb), and bismuth (Bi). Elements within embodiments of the steel composition may be provided as below in Table 1, where the concentrations are in wt. % unless otherwise noted.

TABLE 1

STEEL COMPOSITION

| Element | Broad Composition Range (wt. %) | | Preferred Composition Range (wt. %) | |
|---|---|---|---|---|
| | Minimum | Maximum | Minimum | Maximum |
| C | 0.25 | 0.35 | 0.26 | 0.29 |
| Mn | 0.30 | 0.70 | 0.45 | 0.55 |
| Si | 0.10 | 0.30 | 0.20 | 0.30 |
| S | 0 | 0.10 | 0 | 0.003 |
| P | 0 | 0.015 | 0 | 0.010 |

TABLE 1-continued

STEEL COMPOSITION

| Element | Broad Composition Range (wt. %) | | Preferred Composition Range (wt. %) | |
|---|---|---|---|---|
| | Minimum | Maximum | Minimum | Maximum |
| Cr | 0.90 | 1.70 | 1.30 | 1.50 |
| Mo | 0.60 | 1.00 | 0.65 | 0.070 |
| Ni | 0 | 0.50 | 0 | 0.15 |
| Nb | 0 | 0.040 | 0 | 0.007 |
| V | 0.050 | 0.150 | 0.12 | 0.15 |
| Ti | 0 | 0.015 | 0 | 0.007 |
| Cu | 0 | 0.30 | 0 | 0.15 |
| Al | 0.01 | 0.04 | 0.020 | 0.035 |
| O | 0 | 0.005 | 0 | 0.0015 |
| Ca | 0 | 0.05 | 0 | 0.03 |
| N | 0 | 0.010 | 0 | 0.008 |

C is an element whose addition to the steel composition may inexpensively raise the strength of the steel. In some embodiments, if the C content of the steel composition is less than about 0.25% it may be difficult to obtain the strength desired in the steel. On the other hand, in some embodiments, if the steel composition has a C content greater than about 0.35%, toughness may be impaired. Therefore, in an embodiment, the C content of the steel composition may vary within the range between about 0.25% to about 0.35%, preferably within the range between about 0.26% to about 0.29%.

Mn is an element whose addition to the steel composition may be effective in increasing the hardenability, strength, and toughness of steel. In some embodiments, if the Mn content of the steel composition is less than about 0.30%, it may be difficult to obtain the desired strength in the steel. However, in some embodiments, if the Mn content exceeds about 0.7%, banding structures within the steel become marked and toughness decreases. Accordingly, in an embodiment, the Mn content of the steel composition may vary within the range between about 0.30% to about 0.7%, preferably within the range between about 0.45% to about 0.55%.

Si is an element whose addition to the steel composition may have a deoxidizing effect during steel making process and also raises the strength of the steel. In some embodiments, if the Si exceeds about 0.30%, the toughness and formability of the steel may decrease. Therefore, in an embodiment, the Si content of the steel composition may vary within the range between about 0.10% to about 0.30%, preferably within the range between about 0.20% to about 0.30%.

S is an element that may cause the toughness and workability of the steel to decrease. Accordingly, in some embodiments, the S content of the steel composition is limited to a maximum of about 0.010%, preferably a maximum of about 0.003%.

P is an element may cause the toughness of the steel to decrease. Accordingly, in some embodiments, the P content of the steel composition limited to a maximum of about 0.015%, preferably a maximum of about 0.010%.

Cr is an element whose addition to the steel composition may increase hardenability and tempering resistance of the steel. Therefore, the addition of Cr to the steel composition is desirable for achieving high strength levels. In an embodiment, if the Cr content of the steel composition is less than about 0.90%, it may be difficult to obtain the desired strength within the steel composition. In other embodiments, if the Cr content of the steel composition exceeds about 1.70%, the toughness of the steel composition may decrease. Therefore, in certain embodiments, the Cr content of the steel composition may vary within the range between about 0.90% to about 1.70%, preferably within the range between about 1.30% to about 1.50%.

Mo is an element whose addition to the steel composition is effective in increasing the strength of the steel and further assists in retarding softening during tempering. Mo additions to the steel composition may also reduce the segregation of phosphorous to grain boundaries, improving resistance to inter-granular fracture. In an embodiment, if the Mo content is less than about 0.60%, it may be difficult to obtain the desired strength in the steel. However, this ferroalloy is expensive, making it desirable to reduce the maximum Mo content within the steel composition. Therefore, in certain embodiments, Mo content within the steel composition may vary within the range between about 0.60% to about 1.00%, preferably within the range between about 0.65% to about 0.70%.

Ni is an element whose addition to the steel composition is optional and may increase the strength and toughness of the steel. However, Ni is very costly and, in certain embodiments, the Ni content of the steel composition is limited to less than or equal to about 0.50%, preferably less than or equal to about 0.15%.

Nb is an element whose addition to the steel composition is optional and may refine the austenitic grain size of the steel during hot rolling, with the subsequent increase in both strength and toughness. Nb may also precipitate during tempering, increasing the steel strength by particle dispersion hardening. In an embodiment, the Nb content of the steel composition may vary within the range between about 0% to about 0.40%, preferably within the range between about 0% to about 0.007%.

V is an element whose addition to the steel composition may increase the strength of the steel by carbide precipitation during tempering. In an embodiment, if the V content of the steel composition is less than about 0.050%, it may be difficult to obtain the strength desired in the steel. In other embodiments, of the V content of the steel composition is greater than about 0.150%, a large volume fraction of vanadium carbide particles may be formed, with an attendant reduction in toughness of the steel. Therefore, in certain embodiments, the V content of the steel composition may vary within the range between about 0.05% to about 0.15%, preferably within the range between about 0.12% to about 0.15%.

Ti is an element whose addition to the steel composition is optional and may be used to refine austenitic grain size. However, it is not a requirement in certain embodiments of the steel composition of the present disclosure. Additionally, when present in concentrations higher than about 0.015%, coarse TiN particles may be formed that impair toughness of the steel. Therefore, in certain embodiments, the maximum Ti content of the steel composition may be less than about 0.015%, preferably less than about 0.007%.

Cu is an impurity element that is not required in certain embodiments of the steel composition. However, depending upon the steel fabrication process, the presence of Cu may be unavoidable. Thus, in certain embodiments, the Cu content of the steel composition may be limited to less than or equal to about 0.30%, preferably less than about 0.15%.

Al is an element whose addition to the steel composition has a deoxidizing effect during the steel making process and further refines the grain size of the steel. In an embodiment, if the Al content of the steel composition is less than about 0.10%, the steel may be susceptible to oxidation, exhibiting high levels of inclusions. In other embodiments, if the Al content of the steel composition greater than about 0.40%, coarse precipitates may be formed that impair the toughness of the steel. Therefore, the Al content of the steel composition may vary within the range between about 0.010% to about 0.040%, preferably within the range between about 0.020% to about 0.035%.

O may be an impurity within the steel composition that is present primarily in the form of oxides. In an embodiment of the steel composition, as the O content increases, impact properties of the steel are impaired. Accordingly, in certain embodiments of the steel composition, a relatively low O content is desired, less than or equal to about 0.0050 wt % and preferably less than or equal to about 0.0015 wt %.

Ca is an element whose addition to the steel composition may improve toughness by modifying the shape of sulfide inclusions. In an embodiment, the steel composition may comprise a minimum Ca to S content ratio of Ca/S>1.5. In other embodiments of the steel composition, excessive Ca is unnecessary and the steel composition may comprise a content Ca of less than or equal to about 0.05%, preferably less than or equal to about 0.03%.

The contents of unavoidable impurities including, but not limited to, S, P, N, Pb, Sn, As, Sb, Bi and the like are preferably kept as low as possible. However, properties (e.g., strength, toughness) of steels formed from embodiments of the steel compositions of the present disclosure may not be substantially impaired provided these impurities are maintained below selected levels. In one embodiment, the N content of the steel composition may be less than about 0.010%, preferably less than or equal to about 0.008%. In another embodiment, the Pb content of the steel composition may be less than or equal to about 0.005%. In a further embodiment, the Sn content of the steel composition may be less than or equal to about 0.02%. In an additional embodiment, the As content of the steel composition may be less than or equal to about 0.012%. In another embodiment, the Sb content of the steel composition may be less than or equal to about 0.008%. In a further embodiment, the Bi content of the steel composition may be less than or equal to about 0.003%.

In one embodiment, tubular bars may be formed using the steel composition disclosed above in Table 1. The tubular bars may preferably have a wall thickness selected within the range between about 4 mm to about 25 mm. In one embodiment, the metallic tubular bars may be seamless. In an alternative implementation, the metallic tubular bars may contain one or more seams.

One embodiment of a method 100 of producing high strength metallic tubular bars is illustrated in FIG. 1. In operation 102, the steel composition may be formed and cast into a metallic billet. In operation 104, the metallic billet may be hot formed into a tubular bar. In operations 106, or alternatively operations 112 the formed tubular bar may be subjected to heat treatment. In operation 110, finishing operations may be performed on the bar.

Operation 102 of the method 100 preferably comprises fabrication of the metal and production of a solid metal billet capable of being pierced and rolled to form a metallic tubular bar. In one embodiment, the metal may comprise steel. In further embodiments, selected steel scrap and sponge iron may be employed to prepare the raw material for the steel composition. It may be understood, however, that other sources of iron and/or steel may be employed for preparation of the steel composition.

Primary steelmaking may be performed using an electric arc furnace to melt the steel, decrease phosphorous and other impurities, and achieve a selected temperature. Tapping and deoxidation, and addition of alloying elements may be further performed.

One of the main objectives of the steelmaking process is to refine the iron by removal of impurities. In particular, sulfur and phosphorous are prejudicial for steel because they degrade the mechanical properties of the steel. In one embodiment, secondary steelmaking may be performed in a ladle furnace and trimming station after primary steelmaking to perform specific purification steps.

During these operations, very low sulfur contents may be achieved within the steel, calcium inclusion treatment may be performed, as understood in the art of steelmaking, and inclusion flotation may be performed. In one embodiment inclusion flotation may be performed by bubbling inert gases in the ladle furnace to force inclusions and impurities to float. This technique may produce a fluid slag capable of absorbing impurities and inclusions. In this manner, a high quality steel having the desired composition with a low inclusion content may result. Following the production of the fluid slag, the steel may be cast into a round solid billet having a substantially uniform diameter along the steel axis.

The billet thus fabricated may be formed into a tubular bar through hot forming processes 104. In an embodiment, a solid, cylindrical billet of clean steel may be heated to a temperature of about 1200° C. to 1300° C., preferably about 1250° C. The billet may be further subject to a rolling mill. Within the rolling mill, the billet may be pierced, in certain preferred embodiments utilizing the Manessmann process, and hot rolling may be used to substantially reduce the outside diameter and wall thickness of the tube, while the length is substantially increased. In certain embodiments, the Manessmann process may be performed at temperatures of about 1200° C. The obtained hollow bars may be further hot rolled at temperatures within the range between about 1000° C. to about 1200° C. in a retained mandrel continuous mill. Accurate sizing may be carried out by a sizing mill and the seamless tubes cooled in air to about room temperature in a cooling bed.

In a non-limiting example, a solid bar possessing an outer diameter within the range between about 145 mm to about 390 mm may be hot formed as discussed above into a tube possessing an outer diameter within the range between about 39 mm to about 275 mm and a wall thickness within the range between about 4 mm to about 25 mm. The length of the tubes may vary within the range between about 8 m to 15 m.

Operations 106 (106A, 106B, 106C) and 112 (112A, 112B, 112C, 112D) are two embodiments of heat treatments that may be performed upon the formed metallic tubular bar. As discussed in greater detail below, embodiments of heat treatment operations 106 comprise repeated austenizing and quenching operations, followed by tempering and may be referred to as Double Austenizing (DA). Embodiments of heat treatment operations 112 may comprise repeated sequences of austenizing, quenching, and tempering and may be referred to as Double Heat Treatment (DHT).

The first austenizing/quenching operation 106A may comprise heating a tubular bar formed as discussed above into the austenitic range and quenching. The conditions under which austenizing is performed during the first austenizing/quenching operation 106A may be designated as A1. The conditions under which quenching is performed during the first austenizing/quenching operation 106A may be designated as Q1.

In an embodiment, the austenizing and quenching parameters A1 and Q1 are selected such that the microstructure of the tubular bar after undergoing the first austenizing/quenching operation 106A comprises at least about 95% martensite by volume. The remainder of the microstructure may include substantially only bainite. In further embodiments, the austenizing and quenching parameters A1 and Q1 may also produce a microstructure that is substantially free of carbides. In certain embodiments, a microstructure that is substantially free of carbides may comprise a total carbide concentration less than about 0.01 wt. % carbides on the basis of the total weight of the tubular bar. In further embodiments, the average grain size of the tubular bar may be refined so as to fall within the range between about 10 μm to about 30 μm.

In an embodiment, the austenizing parameters A1 may be selected so as to substantially fully austenize the microstructure of the tubular bar. A tubular bar that is substantially fully austenized may comprise greater than about 99.9 wt. % austenite on the basis of the total weight of the tubular bar. The tubular bar may be heated to a maximum temperature selected within the range between about 900° C. to about 950° C. The heating rate during the first austenizing operation 106A may vary within the range between about 15° C./min to about 60° C./min.

The tubular bar may be subsequently held at the selected maximum temperature for a hold time selected within the range between about 10 minutes to about 30 minutes. The hold time may beneficially enable dissolution of cementite carbides into solution with the steel composition. The relatively low austenizing temperatures employed in embodiments of the presently disclosed heat treatments, within the range between about 900° C. to about 950° C. are employed to restrain, grain growth as much as possible, promoting microstructural refinement that may give rise to improvements in toughness. For these austenizing temperatures, the austenizing temperature range of about 900° C. to about 950° C. is also sufficient to provide substantially complete dissolution of cementite carbides. Within this temperature range, complete dissolution of Nb- and Ti-rich carbides, even when using extremely large holding times, is generally not achieved. The cementite carbides, which are larger than Nb and Ti carbides, may impair toughness and reduce strength by retaining carbon.

Following the hold period, the tubular bar may be subjected to quenching. In an embodiment, quenching during the austenizing/quenching operations 106A may be performed a system of water sprays (e.g., quenching heads). In another embodiment, quenching may be performed using an agitated water pool (e.g., tank) in which additional heat extraction is obtained by a water jet directed to the inner side of the pipe.

Embodiments of the quenching parameters Q1 are as follows. The tubular bar may be cooled at a rate between approximately 15° C./sec to about 50° C./sec to a temperature preferably not greater than about 150° C.

The second austenizing/quenching operation 106B may comprise heating and quenching the tubular bar formed as discussed above into the austenitic range. The conditions of under which austenizing is performed during the second austenizing/quenching operation 106A may be designated as A2. The conditions under which quenching is performed during the second austenizing/quenching operation 106A may be designated as Q2.

In an embodiment, the austenizing and quenching parameters A2 and Q2 are selected such that the microstructure of the tubular bar after undergoing the second austenizing/quenching operation 106B comprises at least about 95% martensite by volume. In further embodiments, the austenizing and quenching parameters A2 and Q2 may produce a microstructure that is also substantially free of carbides.

In additional embodiments, the average grain size of the tubular bar after the second austenizing/quenching operations 106B may be less than that obtained after the first austenizing and quenching operations 106A. For example, the grain size of the tubular fall after the second austenizing/quenching operations 106B may fall within the range between about 5 to about 15 μm. This microstructural refinement may improve the strength and/or the toughness of the tubular bar.

In an embodiment, the second austenizing parameters A2 are as follows. The tubular bar may be heated to a maximum austenizing temperature less than that employed in the first austenizing/quenching operations 106A. The second austenizing A2 takes advantage of the carbide dissolution achieved during the first austenizing/quenching operations 106A in order to further refine the grain size of the microstructure. As substantially all the iron carbides (e.g., cementite particles) are dissolved within the microstructure following the first austenizing and quenching operation, lower austenizing temperatures can be used during the second austenizing and quenching operations with attendant reduction in grain size (grain refinement). In an embodiment, the second austenizing A2 may take place at a temperature selected within the range between about 880° C. to about 930° C. The heating rate during the second austenizing operation 106A may vary within the range between 15° C./min to about 60° C./min. The tubular bar may be subsequently held at the selected maximum temperature for a hold time selected within the range between about 10 to about 30 minutes.

Following the hold period, the tubular bar may be subjected to quenching. In an embodiment, quenching during the austenizing/quenching operations 106B may be performed a system of water sprays (e.g., quenching heads). In another embodiment, quenching may be performed using an agitated water pool (e.g., tank) in which additional heat extraction is obtained by a water jet directed to the inner side of the pipe.

Embodiments of the quenching parameters Q2 are as follows. The tubular bar may be cooled at a rate between approximately 15° C./sec to about 50° C./sec to a temperature preferably not greater than about 150° C.

The second austenizing (A2) is carried out at a slightly lower temperatures than the first austenizing (A1), taking advantage of the carbide dissolution achieved during the first treatment. Austenizing is performed preferably using a maximum temperature of about 880° C. to 930° C. during a time of about 10 to 30 minutes. Then the tubes are quenched (Q2). The objective of the A2+Q2 operations is to produce a microstructure composed of at least 95% martensitic by volume, substantially free of carbides, and having a refined grain size (i.e., smaller or reduced) in comparison to the first treatment (A1+Q1). The microstructural refinement is desired to improve the strength and toughness of the final product.

Following the first and second austenizing/quenching operations 106A, 106B, the tubular bar may be further subjected to a tempering operation 106C, also referred to herein as (T). During the tempering operation 106C, the tubular bar may be heated a temperature within the range between about 450° C. to about 550° C. The heating rate during the tempering operation 106C may vary within the range between about 15° C./min to about 60° C./min. The tubular bar may be further heated to the maximum temperature over a time within the range between about 10 minutes to about 40 minutes. Upon achieving the selected maximum temperature, the tubular bar may be held at about this temperature for a time within the range between about 5 minutes to about 30 minutes.

The hot rolled tube may be further subjected to different post-hot forming operations 110. Non-limiting examples of these operations include cutting the tube to length, and cropping the ends of the tube, straightening the tube using rotary straightening equipment, if necessary, and non-destructive testing by a plurality of different techniques, such as electromagnetic testing or ultrasound testing. In an embodiment, the tubular bars may be straightened at a temperature not lower than the tempering temperature reduced by 50° C., and then cooled in air down to room temperature in a cooling bed. In this fashion, a straight-sided, metallic tubular bar having a composition within the ranges illustrated in Table 1 may be provided.

In an alternative embodiment, the formed tubular bar may be subjected to heat treatment according to heat treatment operations 112. First austenizing and quenching operations 112A (A1) and (Q1) are followed by a first tempering operation 112B (T1), second austenizing and quenching operations 112C (A2) and (Q2), and second tempering operation 112B (T2). The first and second austenizing and quenching operations 112A and 112C may be performed as discussed above with respect to the first and second austenizing and quenching operations 106A and 106B. The first tempering operation 112B may also be performed as discussed above with respect to the first tempering operation 106C.

In certain embodiments, the additional tempering operation 112B (T1) may be performed at temperatures below about 550° C. in order to reduce the likelihood of carbide precipitation before the second austenizing operation (A2). The parameters of the tempering operation 112B may be substantially similar to those of the tempering operation (T) 106C. For example, during the tempering operation 112B, the tubular bar may be heated a temperature within the range between about 450° C. to about 550° C. The heating rate during the tempering operation 112B may vary within the range between about 15° C./min to about 60° C./min. The tubular bar may be further heated to the maximum temperature over a time within the range between about 10 minutes to about 40 minutes. Upon achieving the selected maximum temperature, the tubular bar may be held at about this temperature for a time within the range between about 5 minutes to about 30 minutes.

The hot rolled tube may be further subjected to different post-hot forming operations as discussed above with respect to operation 110.

Figure 2A:
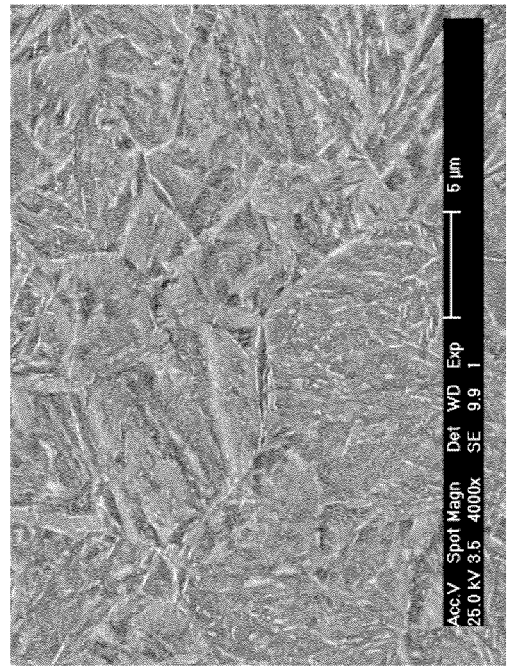
FIGS. 2A-B are micrographs of an embodiment of the steel composition after a double austenizing and tempering heat treatment.
Figure 2B:
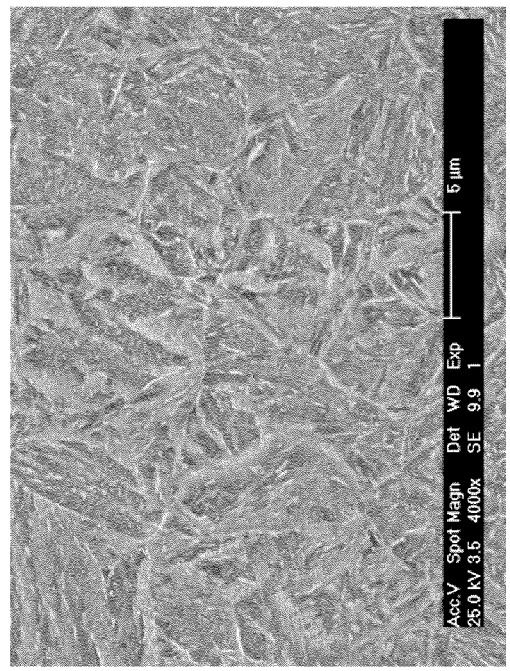

Advantageously, due to the low tempering temperatures employed in the heat treatments 106 and 112, the final microstructure of the steel composition may be composed of tempered martensite having a fine carbide distribution, as illustrated in FIGS. 2A-2B. FIGS. 2A and 2B are images of the microstructure of steel compositions taken by scanning electron microscope (SEM) after the heat treatment operations 106 and 112. The microstructure of FIG. 2A corresponds to a sample after the heat-treatment of operations 106 (A1+Q1+A2+Q2+T) while the microstructure of FIG. 2B corresponds to a sample after the heat treatment of operations 112 (A1+Q1+T1+A2+Q2+T2).

The microstructure obtained from each of the heat treatment operations 106 and 112 are substantially similar from a metallurgical point of view, up to about the maximum resolution allowed by the scanning electron microscope. There is no or substantially no bainite (e.g., less than or equal to about 5% by volume), so the microstructures are fully or substantially fully tempered martensite. The tempered martensite is composed of a ferrite matrix (e.g., dark gray phases) and several types of carbides (light gray particles). The carbides may include iron carbides and vanadium carbides.

With respect to morphology, two types of iron carbides were observed to be present in the microstructure, approximately spherical and elongated. Regarding the spherical iron carbides, the maximum size (e.g., largest dimension such as diameter) was observed to be about 150 nm. Regarding the elongated iron carbides, the maximum size was observed to be about 1 μm length and about 200 nm in thickness. These sizes were found to be consistently similar for both heat treatments 106 and 112.

Fine vanadium carbides are also expected to be present within the microstructure. Considering the low tempering temperature used in embodiments of the fabrication process, the size of these particles is expected to be less than or equal to about 30 nm. While the vanadium carbide precipitates were not able to be observed by scanning electron microscopy, the presence of fine vanadium carbide may observed through their effect on mechanical properties, as the quenched and tempered composition exhibits improvements in strength and toughness by particle dispersion hardening.

Advantageously, seamless steel pipes and tubes formed according to the disclosed embodiments may exhibit very high strength in combination with good toughness. For example, in one embodiment, tubular bars and pipes formed from embodiments of the steel composition may exhibit a yield strength of at least about 175 ksi (about 1200 MPa) as measured according to ASTM Standard E8, "Standard Test Methods for Tension Testing of Metallic Materials," the entirety of which is incorporated by reference. In another embodiment, tubular bars and pipes formed from embodiments of the steel composition may exhibit Charpy V-notch impact energies at room temperature greater than about 65 J/cm$^2$ in the LC direction and about 50 J/cm$^2$ in the CL direction as measured according to ASTM Standard E23, "Standard Test Methods for Notched Bar Impact Testing of Metallic Materials," the entirety of which is incorporated by reference.

The good combination of strength and toughness obtained in embodiments of the steel composition are ascribed, at least in part, to the combination of the steel composition and to the microstructure. In one aspect, the relatively small size of the carbides (e.g., spherical carbides less than or equal to about 150 nm and/or elongated carbides of about 1 μm or less in length and about 200 nm or less in thickness) increase the strength of the steel composition by particle dispersion hardening without strongly impairing toughness. In contrast, large carbides can easily nucleate cracks.

Another microstructural feature is the grain size of the steel composition, which is about 5 to 15 μm in the final product (e.g., after tempering) in one embodiment. Such a small grain size is known to improve toughness by providing barriers to crack propagation.

EXAMPLES

In the following examples, the tensile and impact properties of steel pipes formed using embodiments of the steel making method discussed above are illustrated. The formed steel pipes were tested after heat treatments of double austenizing and tempering (A1+Q1+A2+Q2+T) followed by tempering (DA—Conditions 1 and 3), and double heat treatment (A1+Q1+T1+A2+Q2+T2) (DHT—Conditions 2 and 4). The tested steel pipes possessed an outer diameter of about 114.3 mm and a wall thickness of about 8.31 mm, unless otherwise noted. Experiments were performed on samples having approximately the composition and heat treatments of Tables 2 and 3, respectively.

TABLE 2

COMPOSITION OF SAMPLE SPECIMENS OF EXAMPLE 1

| Element | Composition (wt. %) |
|---|---|
| C | 0.27 |
| Mn | 0.47 |
| Si | 0.24 |
| Cr | 1.44 |
| Mo | 0.65 |
| Ni | 0.046 |
| V | 0.127 |
| Cu | 0.10 |
| S | 0.001 |
| P | 0.008 |
| Al | 0.031 |
| Ti | 0.001 |
| Nb | 0.001 |
| N | 0.0049 |

TABLE 3

HEAT TREATMENTS OF SAMPLE SPECIMENS

| Condition | A1 (° C.) | T1 (° C.) | A2 (° C.) | T2 (° C.) |
|---|---|---|---|---|
| 1 (DA) | 940 | — | 920 | 510 |
| 2 (DHT) | 940 | 510 | 920 | 510 |
| 3 (DA) | 940 | — | 890 | 510 |
| 4 (DHT) | 940 | 510 | 890 | 510 |

Measurements of strength and impact properties were performed on between 3 to 15 pipes for each condition. For each tube, tensile tests were performed in duplicate and impact tests were performed in triplicate at about room temperature. It may be understood that the examples presented below are for illustrative purposes and are not intended to limit the scope of the present disclosure.

Example 1

Room temperature Tensile Properties and Impact Energies

Figure 3:
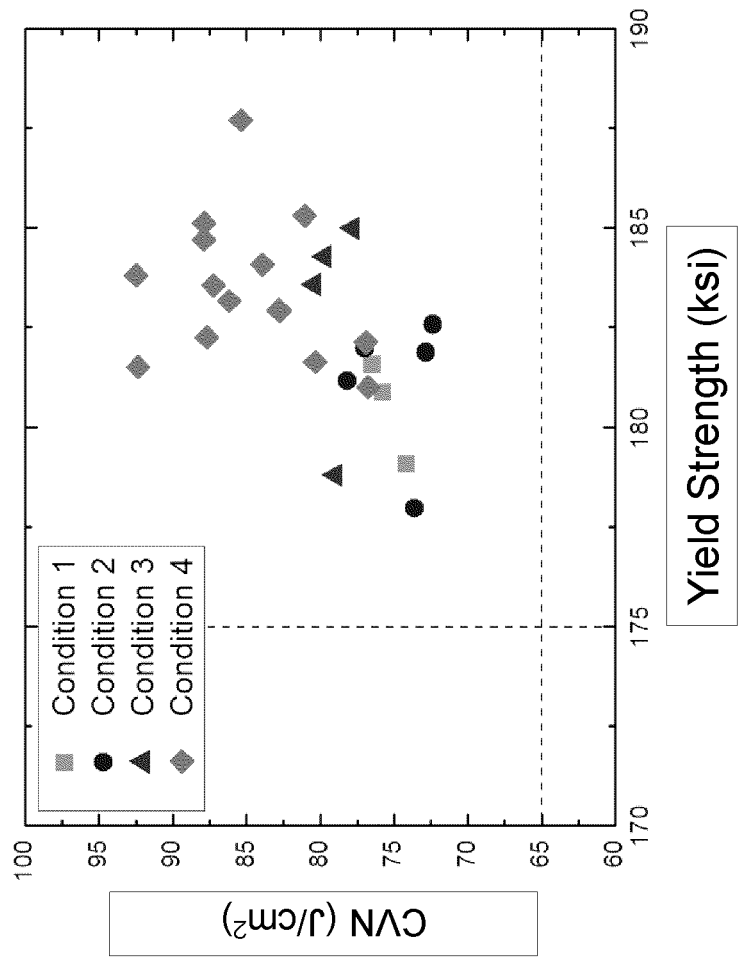
FIG. 3 is a plot of Charpy impact energy (CVN) versus yield strength for embodiments of steels formed from embodiments of the present disclosure.

The strength and elongation the steels of Tables 2 and 3 were measured according to ASTM Standard E8 at about room temperature. The Charpy energies of the steels of Tables 2 and 3 were measured according to ASTM Standard E23 at about room temperature and represent a measure of the toughness of the materials. The Charpy tests were performed on samples having dimensions of about 10×7.5×55 mm taken longitudinally (LC) from the pipes. The average tensile strength, yield strength, elongation, and Charpy V-notch energies (CVN) measured for each condition are reported in Table 4. Average values per tube are shown in FIG. 3.

TABLE 4

AVERAGE TENSILE AND IMPACT PROPERTIES OF SAMPLE SPECIMENS

| Condition | Yield Strength (ksi) | Ultimate Tensile Strength (ksi) | YS/UTS | Elongation at Failure (%) | CVN (J/cm$^2$) |
|---|---|---|---|---|---|
| 1 (DA) | 181 ± 2 | 191 ± 1 | 0.95 | 12 ± 1 | 75 ± 5 |
| 2 (DHT) | 181 ± 2 | 191 ± 3 | 0.95 | 12 ± 2 | 75 ± 5 |
| 3 (DA) | 183 ± 3 | 191 ± 3 | 0.96 | 11 ± 1 | 79 ± 5 |
| 4 (DHT) | 184 ± 2 | 190 ± 2 | 0.97 | 12 ± 1 | 85 ± 5 |

For each of the conditions tested, yield strength was observed to be greater than about 175 ksi and ultimate tensile strength was observed to be greater than or equal to about 190 ksi. The elongation at failure for each of the conditions tested was further found to be greater than or equal to about 11%. The measured Charpy V-notch impact energies at about room temperature were greater than about 65 J/cm$^2$ for each of the conditions tested.

The best combination of tensile properties and toughness were observed for heat treatment condition 4 (diamonds, FIG. 3), which corresponded to double heat treatment using the lower A1 and A2 austenizing temperatures (920° C. and 890° C., respectively). This condition exhibited the largest yield strength (about 184 ksi) and CVN at room temperature (about 85 J/cm$^2$). The improvement in yield strength and toughness is ascribed to the microstructural refinement achieved by the reduction in the first and second austenizing temperatures The strength and toughness provided by the combination of steel composition and heat treatment embodiments described above represent a significant advance in the metallurgical arts. Table 5 below presents comparative steel compositions having elemental compositions outside of the ranges identified in embodiments of the present disclosure. Table 6 presents representative mechanical properties (e.g., strength and toughness) for embodiments of the instant steel compositions subject to double austenizing and double heat treatment (e.g., results from Table 4 for conditions 1-4). Mechanical properties are further presented for embodiments of the instant steel composition subjected to double heat treatment in which the second heat treatment (T2) is outside the preferred range within about 450° C. to about 550° C. (e.g., about 600° C.) and comparative steel compositions subjected to single austenizing, quenching, and tempering operations.

TABLE 5

Chemical Composition of Comparative Example Steels

| | Composition (wt. %) | | |
|---|---|---|---|
| Element | Comparative Example A | Comparative Example B | Comparative Example C |
| C | 0.24 | 0.25 | 0.25 |
| Mn | 0.79 | 0.48 | 0.47 |
| Si | 0.26 | 0.24 | 0.25 |
| Cr | 0.80 | 1.14 | 0.94 |
| Mo | 0.60 | 1.00 | 0.67 |
| Ni | 0.23 | 0.04 | 0.02 |
| V | 0.001 | 0.004 | 0.001 |
| Cu | 0.09 | 0.05 | 0.03 |
| S | 0.001 | 0.001 | 0.001 |
| P | 0.009 | 0.008 | 0.008 |
| Al | 0.026 | 0.024 | 0.027 |
| Ti | 0.010 | 0.001 | 0.001 |
| Nb | 0.003 | 0.027 | 0.028 |
| N | 0.0058 | 0.0050 | 0.0039 |

TABLE 6

Average Tensile and Impact Properties of Instant Steel Embodiments and Comparative Examples

| Composition | Condition | YS (ksi) | UTS (ksi) | CVN* (J/cm$^2$) |
|---|---|---|---|---|
| Table 2 | 1 (DA) | 181 ± 2 | 191 ± 1 | 75 ± 5 |
| Table 2 | 2 (DHT) | 181 ± 2 | 191 ± 3 | 75 ± 5 |
| Table 2 | 3 (DA) | 183 ± 3 | 191 ± 3 | 79 ± 5 |
| Table 2 | 4 (DHT) | 184 ± 2 | 190 ± 2 | 85 ± 5 |
| Table 2 | same as DHT except T2 = 600° C. | 164 ± 2 | 180 ± 2 | 99 ± 3 |
| Comparative Example A | Austenizing Temp. = 900° C. Quenching Tempering Temp. = 490° C. | 158 ± 2 | 170 ± 2 | 85 ± 3 |
| Comparative Example B | Austenizing Temp. = 900° C. Quenching Tempering Temp. = 460° C. | 177 ± 3 | 196 ± 2 | 76 ± 3 |
| Comparative Example C | Austenizing temp == 910° C. Quenching Tempering Temp. = 460° C. | 176 ± 2 | 189 ± 2 | 92 ± 3 |

*Impact tests at room temperature, LC orientation.

In general, while each of the compositions achieves a minimum toughness, with Charpy Impact Energies at about room temperature in the LC orientation greater than about 65 J/cm2, the strength values of the compositions of the present disclosure are generally higher. For example, the steels formed according to embodiments of the present disclosure (e.g., conditions 1-4) exhibit yield strengths of about 181 ksi to about 184 ksi and tensile strengths of about 190 ksi to 191 ksi. In contrast, a steel having the composition of Table 2 of the disclosure with a second tempering temperature of 600° C., outside the preferred range, exhibits lower strength values, with a yield strength of about 158 ksi and a tensile strength of about 180 ksi. Similarly, the comparative steel compositions all exhibit lower yield strength values, ranging between about 158 ksi to about 177 ksi. Tensile strengths vary between about 170 ksi to about 196 ksi.

Example 2

Further Impact Energy Studies

Additional impact energy investigations were performed on steel pipe samples formed according to Condition 2 from about −60° C. to about room temperature. These tests enable measurement of the ductile-to-brittle transition temperature of the steels of the present disclosure, which is an established measure of toughness. For these measurements, samples were taken in both the longitudinal (LC) and transverse (CL) directions. Charpy tests were performed on samples having dimensions of about 10×7.5×55 mm in the LC orientation and about 10×5×55 mm in the CL orientation. The average Charpy V-notch energies for each condition are reported in Table 7.

TABLE 7

AVERAGE TOUGHNESS OF CONDITION 2 SAMPLES

| Size/Orientation | T (° C.) | CVN J/cm$^2$ | Ductile Area (%) |
|---|---|---|---|
| 10 × 7.5 × 55 | RT | 70 ± 3 | 100 |
| LC | 0 | 51 ± 2 | 71 ± 2 |
| | −20 | 38 ± 2 | 39 ± 2 |

TABLE 7-continued

| AVERAGE TOUGHNESS OF CONDITION 2 SAMPLES | | | |
|---|---|---|---|
| Size/Orientation | T (° C.) | CVN J/cm$^2$ | Ductile Area (%) |
| | −40 | 31 ± 1 | 31 ± 2 |
| | −60 | 28 ± 2 | 24 ± 4 |
| 10 × 5 × 55 | RT | 65 ± 3 | 100 |
| CL | 0 | 46 ± 2 | 83 ± 2 |
| | −20 | 35 ± 2 | 53 ± 2 |
| | −40 | 30 ± 1 | 28 ± 2 |
| | −60 | 30 ± 2 | 28 ± 2 |

As illustrated in Table 7, the Charpy samples at about room temperature (RT) exhibit energies of approximately 65 J/cm$^2$ to about 70 J/cm$^2$ and approximately 100% ductile fracture, as observed from the fracture surface. As the test temperature decreased to about −60° C., the Charpy energies dropped by roughly half. Concurrently, the portion of the fracture surface undergoing ductile fracture decreased. From the large reduction in ductile area observed between about 0° C. and about −20° C. (e.g., about 71% to about 39% (LC) and about 83% to about 53% (CL), it was determined that a ductile to brittle transition occurred between about 0° C. and about −20° C.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A steel tube, comprising:
   about 0.25 wt. % to about 0.35 wt. % carbon;
   about 0.30 wt. % to about 0.70 wt. % manganese;
   about 0.10 wt. % to about 0.30 wt. % silicon;
   about 0.90 wt. % to about 1.70 wt. % chromium;
   about 0.60 wt. % to about 1.00 wt. % molybdenum;
   about 0.050 wt. % to about 0.150 wt. % vanadium;
   about 0 wt. % to about 0.15 wt % copper and
   about 0.01 wt. % to about 0.04 wt. % aluminum;
   the remainder of the composition comprising iron and impurities;
   wherein the steel tube is processed to have a yield strength greater than about 175 ksi and wherein a Charpy V-notch energy is greater or equal to about 50 J/cm$^2$ in a transverse direction and 65 J/cm$^2$ in a longitudinal direction at about room temperature.

2. The steel tube of claim 1, further comprising:
   about 0.26 wt. % to about 0.29 wt. % carbon;
   about 0.45 wt. % to about 0.55 wt. % manganese;
   about 0.20 wt. % to about 0.30 wt. % silicon;
   about 1.30 wt. % to about 1.50 wt. % chromium;
   about 0.65 wt. % to about 0.70 wt. % molybdenum;
   about 0.12 wt. % to about 0.15 wt. % vanadium;
   about 0.020 wt. % to about 0.035 wt. % aluminum; and
   about 0 to about 0.03 wt. % calcium.

3. The steel tube of claim 1, wherein the tensile strength of the steel tube is greater than about 180 ksi.

4. The steel tube of claim 1, wherein the steel tube exhibits 100% ductile fracture at about room temperature.

5. The steel tube of claim 1, wherein the microstructure of the steel tube comprises greater than or equal to about 95% martensite by volume.

6. The steel tube of claim 5, wherein the remainder of the microstructure consists essentially of bainite.

7. The steel tube of claim 1, wherein the microstructure of the steel tube comprises an average grain size between about 5 μm to about 15 μm.

8. The steel tube of claim 1, further comprising at least one of:
   less than or equal to about 0.50% nickel;
   less than or equal to about 0.040 wt. % niobium;
   less than or equal to about 0.015 wt. % titanium; and
   less than or equal to about 0.05 wt. % calcium.

9. The steel tube of claim 1, wherein the steel tube is processed to have a plurality of approximately spherical carbides having a largest dimension less than or equal to about 150 nm.

10. The steel tube of claim 1, wherein the steel tube is processed to have a plurality of elongated carbides having a length less than or equal to about 1 μm and a thickness less than or equal to about 200 nm.

11. The steel tube of claim 1, wherein the steel tube is processed to have vanadium carbide precipitates.

12. The steel tube of claim 1, further comprising about 0 wt. % copper.

13. The steel tube of claim 1, wherein the steel tube is processed to have a yield strength greater than about 184 ksi.

14. The steel tube of claim 1, wherein the Charpy V-notch energy is greater or equal to 85 J/cm$^2$ in the longitudinal direction at about room temperature.

* * * * *